US012668552B2

(12) United States Patent
Zeng et al.

(10) Patent No.: US 12,668,552 B2
(45) Date of Patent: Jun. 30, 2026

(54) CONTINUOUS MEMBRANE-COVERED AEROBIC FERMENTATION SYSTEM AND ITS APPLICATION METHOD

(71) Applicant: Inst. of Environ. & Sustain. Dev. in Agric., CAAS, Beijing (CN)

(72) Inventors: Jianfei Zeng, Beijing (CN); Hongmin Dong, Beijing (CN); Xiuping Tao, Beijing (CN); Bin Shang, Beijing (CN); Zhiping Zhu, Beijing (CN)

(73) Assignee: Inst. Of Environ. & Sustain. Dev. in Agric., CAAS, Beijing (CN)

( * ) Notice: Subject to any disclaimer, the term of this patent is extended or adjusted under 35 U.S.C. 154(b) by 732 days.

(21) Appl. No.: 18/044,244

(22) PCT Filed: Jan. 25, 2022

(86) PCT No.: PCT/CN2022/073649
§ 371 (c)(1),
(2) Date: Mar. 7, 2023

(87) PCT Pub. No.: WO2022/166672
PCT Pub. Date: Aug. 11, 2022

(65) Prior Publication Data
US 2023/0365475 A1     Nov. 16, 2023

(30) Foreign Application Priority Data
Feb. 8, 2021     (CN) .......................... 202110178368.7

(51) Int. Cl.
*C05F 17/00*          (2020.01)
*C05F 17/957*          (2020.01)
(Continued)

(52) U.S. Cl.
CPC .......... *C05F 17/957* (2020.01); *C05F 17/979* (2020.01); *C05F 17/986* (2020.01)

(58) Field of Classification Search
CPC ................................. C05F 17/964; C05F 3/06
See application file for complete search history.

(56) References Cited

U.S. PATENT DOCUMENTS

| | | | | | |
|---|---|---|---|---|---|
| 2012/0064562 A1* | 3/2012 | Allen | .................... | C05F 17/979 435/267 |
| 2014/0113361 A1* | 4/2014 | Berasi | .................... | C12M 41/22 435/289.1 |
| 2015/0299632 A1* | 10/2015 | Choi | ...................... | C12M 23/38 435/290.2 |

FOREIGN PATENT DOCUMENTS

| | | | | |
|---|---|---|---|---|
| CN | 209456333 U | * | 10/2019 | |
| CN | 111675558 A | * | 9/2020 | ............ C05F 17/964 |

OTHER PUBLICATIONS

English translation of CN 111675558 to Yan et al, generated 2025.*
(Continued)

*Primary Examiner* — Nathan A Bowers
(74) *Attorney, Agent, or Firm* — HoustonHogle LLP

(57) ABSTRACT
A continuous membrane-covered aerobic fermentation system and an application method thereof are disclosed. The system comprises: a fermentation trough which is formed by underground walls of trough, above-ground walls of trough, and a trough bottom; a membrane changing machine configured for performing membrane uncovering, membrane laying, or membrane changing treatments on a semipermeable membrane covered on the fermentation trough and materials in the trough; a pile turning machine configured for direct turning and further mixing the materials under the membrane without uncovering the membrane, and gradually shifting and conveying the materials to another fixed position; and a condensate collecting system configured for continuously collecting the condensate on a inner surface of the semipermeable membrane in real time and guiding out the condensate.

13 Claims, 3 Drawing Sheets

(51) Int. Cl.
*C05F 17/979* (2020.01)
*C05F 17/986* (2020.01)
*C12M 1/00* (2006.01)

(56) References Cited

OTHER PUBLICATIONS

English translation of CN 209456333 to Yang et al, generated 2025.*

* cited by examiner 1  2  3  4  5  6  7  8  9  10  11  12  A 13  14

B

4

15

13

14

CONTINUOUS MEMBRANE-COVERED AEROBIC FERMENTATION SYSTEM AND ITS APPLICATION METHOD

RELATED APPLICATIONS

This application is a § 371 National Phase Application of International Application No. PCT/CN2022/073649, filed on Jan. 25, 2022, now International Publication No. WO 2022/166672 A1, published on Aug. 11, 2022, which International Application claims priority to Chinese Patent Application 202110178368.7, filed on Feb. 8, 2021, both of which are incorporated herein by reference in their entirety.

TECHNICAL FIELD

The present disclosure relates to the technical fields of organic solid waste disposal and resource utilization, and specifically relates to a continuous membrane-covered aerobic fermentation system and its application method thereof.

BACKGROUND

Thermophilic aerobic fermentation is one of the mainstream treatment methods to stabilize, dry, reduce the volume of and recycle livestock and poultry manure in China at present. In recent years, membrane-covered aerobic fermentation, as a newly-developing, efficient and environment-friendly fermentation method, has been widely applied to transfer organic wastes into fertilizers and bedding materials. The main characteristic of this method is that the whole fermentation process is maintained in a closed environment by covering the materials with a semipermeable membrane. Micropores of about 0.2 µm in diameter are evenly distribute in the semipermeable membrane, leading that carbon dioxide, water vapor and other micromolecular gases generated in the fermentation process can emit outside, but water drops, pathogenic bacteria, dust and other large-particle-size substances cannot. Meanwhile, by covering the pile with semipermeable membrane, the pile is maintained in a micro-positive pressure microclimate environment, the oxygen supply and utilization rate are higher, the temperature rise faster, and the thermophilic duration last longer.

The membrane-covered aerobic fermentation mode has the advantages of high efficiency, environmental protection and so on, but the following problems are still to be solved. Firstly, the current membrane-covered aerobic fermentation technology belongs to a batch type treatment technology, materials under the membrane cannot be moved during the fermentation process and material outside the membrane cannot be added into the pile continuously or temporarily, so that raw materials such as livestock and poultry manure need to be stored and gathered in an open place for a long time, leading to the increase of the pollutant gas emissions in the storage process. Secondly, a matched pile turning equipment is lacked in the membrane-covered aerobic fermentation mode, and the pile is gradually compacted, causing the in homogeneous fermentation. Thirdly, water removal is slow only by forced ventilation and the water content is still high after the materials are decomposed and stabilized in the membrane-covered aerobic fermentation process.

SUMMARY

In order to solve the problems, the present disclosure aims to provide a continuous membrane-covered aerobic fermentation system. Continuous feeding, material shifting, continuous discharging and microbial agent timing spraying in the membrane-covered aerobic fermentation process are realized through a pile turning machine; synchronous operation of membrane laying and membrane uncovering is achieved through a membrane changing machine; real-time collecting, short-distance conveying and temporary storage of condensate are achieved through a condensate collecting system; and efficient ventilation and high-quality fermentation are achieved through a sectional ventilation system.

The present disclosure further aims to provide an application method of the continuous membrane-covered aerobic fermentation system.

To achieve the above purpose, the present disclosure adopts the following technical solutions.

The continuous membrane-covered aerobic fermentation system comprising:

a fermentation trough which is formed by underground walls of trough, above-ground walls of trough, and a trough bottom; two above-ground walls of trough are fixedly arranged at tops of two underground walls of trough respectively, each above-ground wall of trough is thinner than corresponding underground wall of trough, and an inner surface of each above-ground wall of trough is flush with an inner surface of the corresponding underground wall of trough; a membrane changing machine configured for performing membrane uncovering, membrane laying, or membrane changing treatments on a semipermeable membrane covered on the fermentation trough and materials in the fermentation trough; a pile turning machine configured for direct turning and further mixing the materials under the membrane without uncovering the membrane, and gradually shifting and conveying the materials to another fixed position; and a condensate collecting system configured for continuously collecting condensate on the inner surface of the semipermeable membrane in real time and guiding out the condensate.

According to the continuous membrane-covered aerobic fermentation system, preferably, the fermentation trough comprises a feeding area, a fermentation area and a discharging area which are sequentially connected to one another from left to right; and an inlet for pile turning machine and an outlet for pile turning machine are formed at two ends of the fermentation trough respectively, the outlet for pile turning machine is connected to the feeding area, and the inlet for pile turning machine is connected to the discharging area.

Preferably, the continuous membrane-covered aerobic fermentation system further comprises a sectional ventilation device, wherein the sectional ventilation device comprises an underground ventilation chamber, fans arranged in the underground ventilation chamber, and ventilation ducts, and the underground ventilation chamber is located in middle of the whole fermentation trough and transversely embeds in the trough bottom along a width direction of the fermentation trough; and two groups of fans are arranged, and the two groups of fans are connected to a left end and a right end of the fermentation trough through two groups of ventilation ducts respectively.

According to the continuous membrane-covered aerobic fermentation system, preferably, the membrane changing machine comprises:

a main body support for the membrane changing machine, the main body support for the membrane changing machine at least comprising transverse bearing plates, longitudinal fixing supports for membrane changing, hydraulic telescopic frames and rolling wheel support frames; two transverse bearing plates are symmetrically arranged on two sides of the main body support for the membrane changing machine respectively; the longitudinal fixing supports for membrane changing stretch across an upper portions of the transverse bearing plates on a left side and a right side, and a lower end of the longitudinal fixing support for membrane changing is fixedly connected to the middle part of the transverse bearing plate on the same side; every two of four rolling wheel support frames form a group, the two groups of rolling wheel support frames are arranged at a front end and a rear end of the main body support for the membrane changing machine respectively, one end of each rolling wheel support frame is hinged to an upper end of the longitudinal fixing support for membrane changing, and another end of each rolling wheel support frame is a free end; every two of four hydraulic telescopic frames form a group, and the two groups of hydraulic telescopic frames are arranged at the front end and the rear end of the main body support for the membrane changing machine respectively; one end of each hydraulic telescopic frame is hinged to the middle of the longitudinal fixing support for membrane changing, and another end of each hydraulic telescopic frame is hinged to the rolling wheel support frame;

a walking device for the membrane changing machine, the walking device comprising walking wheels and a walking motor; every two of four walking wheels form a group, the two groups of walking wheels are arranged on a left side and a right side of the main body support for the membrane changing machine respectively, and two walking wheels in each group are connected to a front end and a rear end of the transverse bearing plate through connecting pieces respectively; an output shaft of the walking motor is connected to a central shaft of one of the walking wheels, and the walking motor is arranged on a transverse bearing plate on one side;

a membrane changing device, the membrane changing device comprising a detachable rolling wheel for membrane uncovering, a detachable rolling wheel for membrane laying, a motor for membrane uncovering, a motor for membrane laying, two baffle discs for membrane uncovering and two baffle discs for membrane laying; two sides of the detachable rolling wheel for membrane uncovering are fixedly connected with two baffle discs for membrane uncovering, and a whole body formed by the detachable rolling wheel and baffle discs for membrane uncovering and baffle discs for membrane uncovering is detachably connected to the free ends of the two rolling wheel support frames located at the front end of the main body support for the membrane changing machine; an output shaft of the motor for membrane uncovering is connected to a central shaft on one side of the detachable rolling wheel for membrane uncovering and configured for driving the detachable rolling wheel for membrane uncovering to rotate; two sides of the detachable rolling wheel for membrane laying are fixedly connected to two baffle discs for membrane laying, and a whole body formed by the detachable rolling wheel and baffle discs for membrane laying is detachably connected with the free ends of the two rolling wheel support frames located at the rear end of the main body support for the membrane changing machine; an output shaft of the motor for membrane laying is connected to a central shaft on one side of the detachable rolling wheel for membrane laying and configured for driving the detachable rolling wheel for membrane laying to rotate; and a control platform, the control platform comprising a fixed fence, a display controller and a ladder; the control platform is integrally supported and fixed by three control console support frames, the ladder and a top end of the longitudinal fixing support for membrane changing in a combined mode and located between the detachable rolling wheel for membrane uncovering and the detachable rolling wheel for membrane laying; the fixed fence is welded on a metal floor of the control platform and configured for preventing an operator from falling off; the display controller is arranged in the fixed fence, connected to walking motor, the motor for membrane uncovering and the motor for membrane laying through connecting lines, and configured for controlling the walking and turning of the whole machine, lifting and falling of the detachable rolling wheel for membrane uncovering and the detachable rolling wheel for membrane laying and rotation of the detachable rolling wheel for membrane uncovering and membrane laying through a preset intelligent control program; an upper end of the ladder is fixed to the metal floor of the control platform and connected to an inlet of the fixed fence, and a lower end of the ladder is fixedly connected to the transverse bearing plate on one side.

According to the continuous membrane-covered aerobic fermentation system, preferably, the pile turning machine comprises:

a walking device for the pile turning machine, the walking device comprising a crawler belt and a power device of crawler belt connected to the crawler belt;

a main body support for the pile turning machine, the main body support for the pile turning machine comprising two transverse bearing supports and two longitudinal fixing supports for pile turning; the two transverse bearing supports are arranged on two sides of the crawler belt respectively, and a lower end of each longitudinal fixing support for pile turning is fixedly connected to the transverse bearing support on the same side;

a chain plate conveying device, the chain plate conveying device is obliquely arranged above the transverse bearing supports; a front part of the chain plate conveying device is fixed to front ends of the two transverse bearing supports through two front racks of chain plate located on two sides of the chain plate conveying device, a rear part of the chain plate conveying device is fixed to the rear ends of two transverse bearing supports through two rear racks of chain plate located on the two sides of the chain plate conveying device, and two sides of the middle part of the chain plate conveying device are connected to two longitudinal fixing supports for pile turning respectively; the chain plate conveying device is configured for actively grabbing materials in the middle layer and bottom layer, mixing the actively grabbed materials with materials in the top and middle layer turned and thrown to the chain plate conveying device through a material taking device and conveying the mixed materials to a rear position at a fixed distance;

a material taking device, the material taking device is arranged above the chain plate conveying device; two sides of a rear end of the material taking device are hinged to upper ends of the two longitudinal fixing supports for pile turning respectively, and the material taking device is configured for cutting up the materials in the top and middle layer and turning and throwing the materials backwards to the chain plate conveying device, so that the porosity and permeability of the materials are recovered, and sufficient gas and heat exchange is generated between the materials and environment; and a support frame for material taking, the support frame for material taking comprising two static support rods and two hydraulic telescopic rods, one end of each static support rod is fixedly connected to the transverse bearing support on the same side, so that when the pile turning machine is in a non-working state, the static support rods bear the material taking device; one end of each hydraulic telescopic rod is hinged to one side of the material taking device, another end of each hydraulic telescopic rod is hinged to the transverse bearing support on the same side, and a hydraulic power device provides power for the hydraulic telescopic rods to stretch out and draw back in the length direction.

According to the continuous membrane-covered aerobic fermentation system, preferably, the main body support for the pile turning machine further comprises a first partition plate, a second partition plate, a first compartment support and a second compartment support, the first partition plate and the second partition plate are arranged in a space between the chain plate conveying device and the walking device in parallel and divide the space into an top layer area, a middle layer area and a bottom layer area, the upper end of the first compartment support is connected to the first partition plate, and the lower end of the first compartment support is connected to the second partition plate; and the upper end of the second compartment support is connected to the second partition plate, and the lower end of the second compartment support is connected to the transverse bearing supports.

According to the continuous membrane-covered aerobic fermentation system, preferably, the chain plate conveying device comprises a bucket, a chain plate, a belt wheel of chain plate and a power device of chain plate, and the bucket is connected to the front end of the chain plate and configured for scraping down compacted materials in the bottom layer;

the chain plate comprises an oblique grabbing part and a transverse conveying part horizontally extended from the rear end of the oblique grabbing part, a front part of the oblique grabbing part is fixed to a front ends of the transverse bearing supports through the front racks of chain plate, and the transverse conveying part is fixed to a rear ends of the transverse bearing supports through the rear racks of chain plate; a bending position between the oblique grabbing part and the transverse conveying part is connected to the longitudinal fixing supports for pile turning through the belt wheels of chain plate;

the belt wheels of chain plate comprises a first belt wheel, a second belt wheel and a first belt, the first belt wheel is arranged at the bending position of the chain plate, the second belt wheel is arranged in atop layer area of the space between the chain plate conveying device and the walking device, and the first belt is sequentially wound on the first belt wheel and the second belt wheel;

the power device of chain plate is connected to the second belt wheel and configured for driving the second belt wheel to rotate, and the power device of chain plate is fixed to the first partition plate;

the material taking device comprises a rack, a rotary drum, a belt wheel for material taking and a power device of rotary drum and protective cover of rotary drum, the rotary drum is rotatable and arranged at a front end of the material taking rack, and the front end of the material taking rack is hinged to an upper end of the hydraulic telescopic rods and a rear end of the material taking rack is hinged to an upper end of the longitudinal fixing support for pile turning; when the pile turning machine is in a non-working state, free ends of the static support rods bear the front part of the material taking rack;

the belt wheel for material taking comprises a third belt wheel, a fourth belt wheel and a second belt, and center of the third belt wheel is arranged on a rotating shaft of the rotary drum for material taking; the second belt is sequentially wound on the third belt wheel and the fourth belt wheel;

the power device of rotary drum is connected to the fourth belt wheel and configured for driving the fourth belt wheel to rotate; and the protective cover of rotary drum is closed in upper and rear end, and a rear end of the protective cover is connected to the material taking rack and arranged and covered above the material taking rotary drum.

According to the continuous membrane-covered aerobic fermentation system, preferably, the pile turning machine further comprises a spraying device, the spraying device comprises a functional liquid tank configured for accommodating liquid with different functions, a spraying rod and a spraying head, one end of the spraying rod extends into the functional liquid tank, the spraying head is arranged at another end of the spraying rod, and a spraying pump is arranged between the spraying rod and the functional liquid tank.

According to the continuous membrane-covered aerobic fermentation system, preferably, the condensate collecting system comprises:

a U-shaped diversion part, the U-shaped diversion part is a U-shaped component composed of restraining diversion parts on a left side and a right side and a bearing part at the bottom and arranged at the top of the above-ground walls of trough; a length and a width of the U-shaped diversion part are equal to those of top surfaces of the above-ground wall of trough; the U-shaped diversion part is tightly attached to the top surfaces of the above-ground walls of trough; in a length direction of the above-ground wall of trough, the top surface of each above-ground wall of trough is provided with a gentle slope structure with a high middle part and two low ends, and the two ends are of arc-shaped structures;

a semipermeable membrane, the semipermeable membrane is covered on two parallel above-ground walls of the trough and the materials stacked in the trough through the membrane changing machine, and the U-shaped diversion part is wrapped under the semipermeable membrane; membrane fixing buckles are arranged on the outer surfaces of the above-ground wall of trough, membrane fixing holes are formed in the semipermeable membrane, and the semipermeable membrane is fixed to the above-ground wall of the trough by cooperation of the membrane fixing buckles and the membrane fixing holes; and the conveying channels, the conveying channels are arranged underground at the ends of the above-ground walls of trough; one end of the conveying channel is connected to the U-shaped diversion part, and another end of the conveying channel is connected to a faucet.

An application method of the continuous membrane-covered aerobic fermentation system comprises the following steps:

i) building the fermentation trough to make sure that a distance between the two above-ground walls of the fermentation trough is larger than a width of the pile turning machine and smaller than a distance between walking wheels on two sides of the membrane changing machine, and an overall height of the fermentation trough is larger than a height of the pile turning machine;

ii) staking materials to be treated in the feeding area of the fermentation trough every day, the materials with different properties can be stacked in an inter layer mode;

iii) covering the membrane by using the membrane changing machine, fixing the semipermeable membrane through the membrane fixing buckles and the membrane fixing holes, and performing forced ventilation by using the ventilation device;

iv) operating the pile turning machine to enter the trough from the inlet for pile turning machine and pass by the discharging area and fermentation area sequentially, and then shifting the materials in the feeding area to the fermentation area by pile turning, after pile turning is completed, moving out the pile turning machine from the outlet for pile turning machine;

v) adding materials into the feeding area every day, turning the materials by the pile turning machine and simultaneously shifting the materials to the end of the discharging area, gradually filling the fermentation trough with the materials, moving initial materials out of the discharging area after complete fermentation and decomposition, collecting the condensate generated during the fermentation process in real time by the condensate collecting system, and then conveying and discharging the condensate by the conveying channels; and vi) changing the semipermeable membrane by using the membrane changing machine to clean the membrane due to the fact that pores in the membrane are gradually blocked during the fermentation process.

The continuous membrane-covered aerobic fermentation system and its application method have the following advantages.

Firstly, according to the continuous membrane-covered aerobic fermentation system, direct pile turning under the membrane is performed through the special multifunctional efficient pile turning machine and realize the continuous feeding, material shifting, continuous discharging and microbial agent timing spraying, so that the in homogeneity and fermentation efficiency of the materials are effectively improved, furthermore, the pollution problem caused by open-air stacking of the materials to be treated is avoided.

Secondly, according to the continuous membrane-covered aerobic fermentation system, synchronous operation of membrane laying and membrane uncovering is achieved through a special membrane changing machine, so that the membrane changing efficiency is effectively improved, and membrane abrasion, odor and greenhouse gas emission and heat loss are reduced.

Thirdly, according to the continuous membrane-covered aerobic fermentation system, real-time collecting, short-distance conveying and temporary storage of condensate are achieved through a condensate collecting system, so that the water removal efficiency during the fermentation process is effectively improved.

Fourthly, according to the continuous membrane-covered aerobic fermentation system, sectional efficient ventilation is achieved through a sectional ventilation system, so that the oxygen supply efficiency is effectively improved, and the ventilation cost is reduced.

REFERENCE SIGNS IN THE ATTACHED FIGURES

1, outlet for pile turning machine; 2, feeding area; 3, ventilation duct; 4, above-ground wall of the trough; 41, membrane fixing buckle; 5, semipermeable membrane; 51, membrane fixing hole; 6, U-shaped diversion part; 7, fermentation area; 8, underground ventilation chamber; 9, membrane changing machine; 901, transverse bearing plate for membrane changing; 902, longitudinal fixing support for membrane changing; 903, hydraulic telescopic frame; 904, rolling wheel support frame; 905, walking wheel; 906, walking motor; 907, detachable rolling wheel for membrane uncovering; 908, detachable rolling wheel for membrane laying; 909, motor for membrane uncovering; 910, motor for membrane laying; 911, baffle disc for membrane uncovering; 912, baffle disc for membrane laying; 913, fixed fence; 914, display controller; 915, ladder; 916, control console support frame; 10, discharging area; 11, pile turning machine; 1101, crawler belt; 1102, power device of crawler belt; 1103, transverse bearing support for pile turning; 1104, longitudinal fixing support for pile turning; 1105, front rack of chain plate; 1106, rear rack of chain plate; 1107, static support rod for material taking; 1108, hydraulic telescopic rod for material taking; 1109, bucket; 1110, chain plate; 1111, belt wheel of chain plate; 1112, power device of chain plate; 1113, rack for material taking; 1114, rotary drum for material taking; 1115, belt wheel for material taking; 1116, power device of rotary drum; 1117, protective cover of rotary drum; 1118, functional liquid tank; 1119, spraying rod; 1120, spraying head; 12, inlet for pile turning machine; 13, fan; 14, trough bottom; 15, underground wall of the trough; and 16, conveying channel.

DETAILED DESCRIPTION OF THE EMBODIMENTS

The following detailed description of preferred embodiments of the present disclosure is taken in conjunction with the attached figures to provide a clearer understanding of the objects, features and advantages of the present disclosure. It should be understood that the embodiments shown in the attached figures are not intended to limit the scope of the present disclosure, but are merely intended to illustrate the essential spirit of the technical schemes of the present disclosure.

Figure 1:
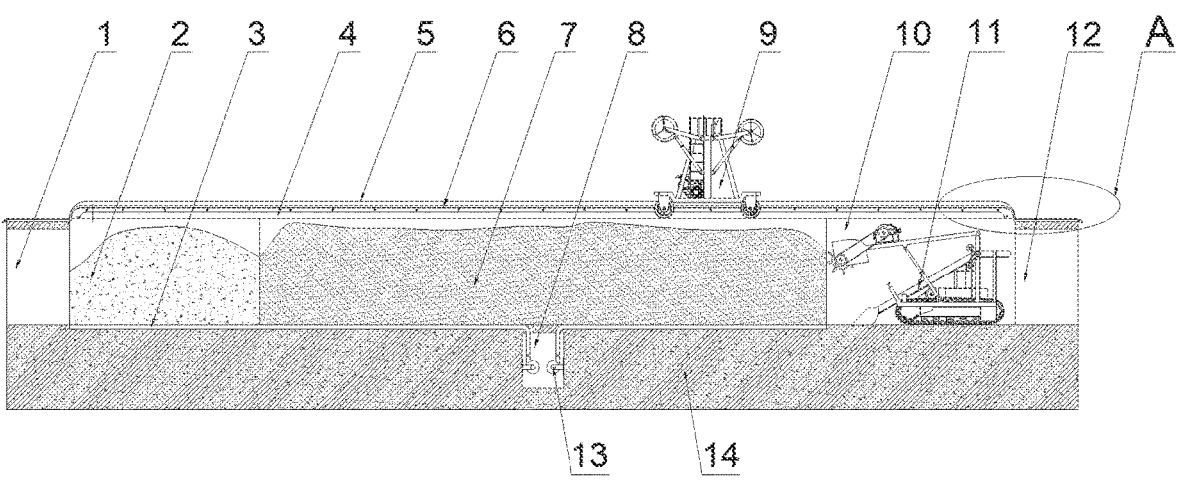
FIG. 1 is a front-view structural schematic diagram of a continuous membrane-covered aerobic fermentation system in the present disclosure.
Figure 2:
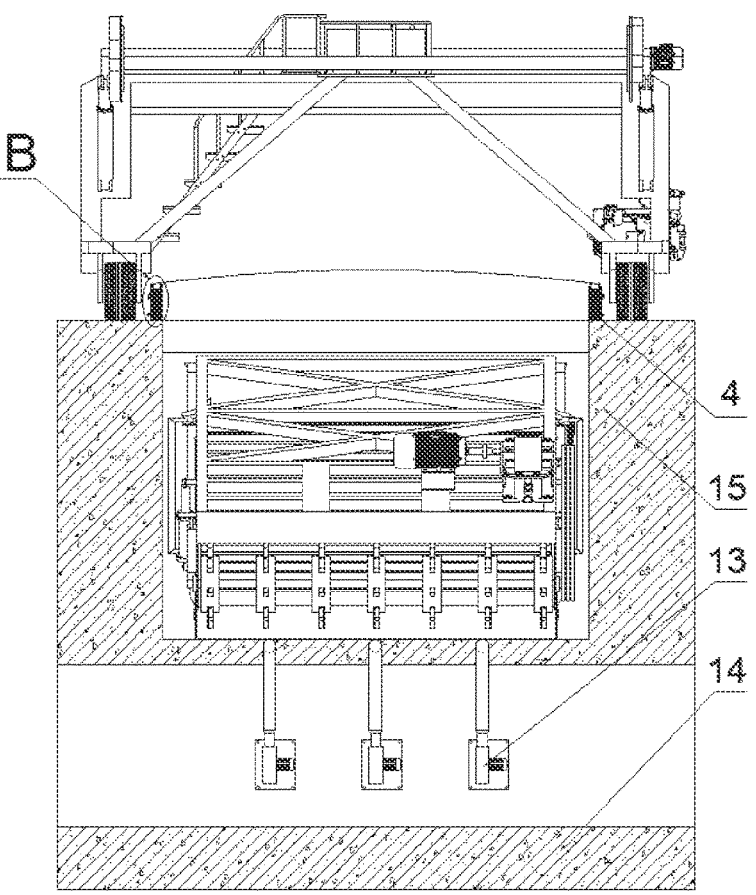
FIG. 2 is a side-view structural schematic diagram of a continuous membrane-covered aerobic fermentation system in the present disclosure.

As shown in FIG. 1 and FIG. 2, the continuous membrane-covered aerobic fermentation system provided by the present disclosure comprises: a fermentation trough which is a trough body structure formed by an underground wall of the trough 15, an above-ground wall of the trough 4, and a trough bottom 14; the two above-ground walls of the trough 4 are fixedly arranged at the tops of the two underground walls of the trough 15 respectively, the thickness of the above-ground wall of the trough 4 is smaller than that of the underground wall of the trough 15, and the inner side wall of the above-ground wall of the trough 4 is flush with the inner side wall of the underground wall of the trough 15; a membrane changing machine 9 configured for performing membrane uncovering, membrane laying, or membrane changing treatments on a semipermeable membrane covered on the fermentation trough and materials in the trough; a pile turning machine 11 configured for direct turning and further mixing the materials under the membrane without uncovering the membrane, and gradually shifting and conveying the materials to another fixed position, namely the direction of a discharging opening; and a condensate collecting system configured for continuously collecting condensate on the inner surface of the semipermeable membrane in real time and guiding out the condensate.

In the embodiment, preferably, the fermentation trough comprises a feeding area 2, a fermentation area 7 and a discharging area 10 which are sequentially connected from left to right; and a outlet for pile turning machine 1 and an inlet for pile turning machine 12 are formed in the two ends of the fermentation trough respectively, the outlet for pile turning machine 1 is connected to the feeding area 2, and the inlet for pile turning machine 12 is connected to the discharging area 10. Wherein, the feeding area 2 is mainly configured for preliminary mixing and temporary storage of materials to be treated, the discharging area 10 is mainly configured for removal of decomposed materials, the fermentation area 7 is located between the feeding area and the discharging area and mainly used for high-temperature aerobic fermentation of the materials to be treated, and under the action of the pile turning machine 11, the materials shift from the feeding area 2 to the discharging area 10 in the fermentation area 7.

In the embodiment, preferably, the continuous membrane-covered aerobic fermentation system further comprises a sectional ventilation device, wherein the sectional ventilation device comprises an underground ventilation chamber 8, fans 13 arranged in the underground ventilation chamber, and ventilation ducts 3, the underground ventilation chamber 8 is located in the middle of the whole fermentation trough and transversely penetrates to be embedded in the trough bottom 14 along the width direction of the fermentation trough, the underground ventilation chamber 8 is mainly configured for accommodating the fans and dividing the ventilation system into a left section and a right section, and materials at the two ends can be subjected to sectional ventilation by adopting different ventilation strategies based on different fermentation conditions of the materials at the left end and the right end of the fermentation trough so as to improve ventilation efficiency; the fans 13 are located in the underground ventilation chamber 8 and are divided into a left group and a right group, the two groups of fans 13 are connected to the left end and the right end of the fermentation trough through the two groups of ventilation ducts 3 respectively, and the fans 13 are mainly configured for performing forced ventilation oxygen supply on the materials in the feeding area 2 and the fermentation area 7; and the ventilation ducts 3 are embedded in the hardened ground under the materials in the feeding area and the fermentation area and mainly configured for conveying high-pressure air provided by the fans to different areas of the materials to achieve uniform oxygen supply.

Figure 3:
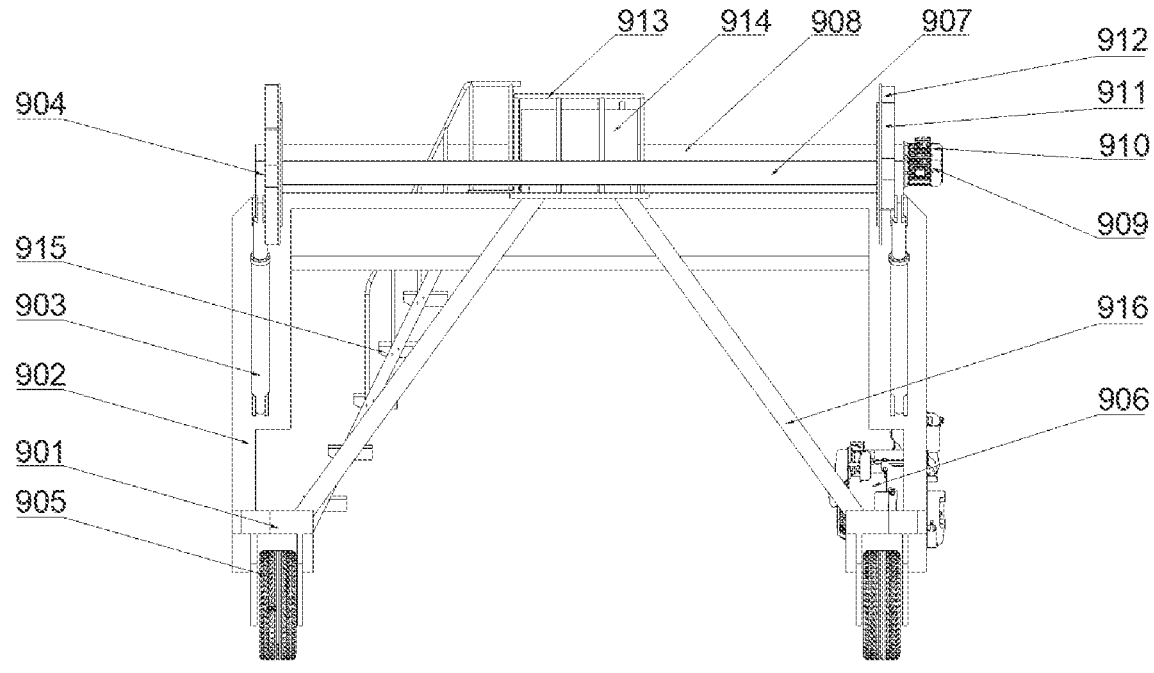
FIG. 3 is a structural schematic diagram of a membrane changing machine in FIG. 1.

In the embodiment, preferably, as shown in FIG. 3, the membrane changing machine 9 comprises:

a main body support for the membrane changing machine, the main body support for the membrane changing machine at least comprising transverse bearing plates for membrane changing 901, a longitudinal fixing support for membrane changing 902, hydraulic telescopic frames 903 and rolling wheel support frames 904; the two transverse bearing plates 901 are symmetrically arranged on the two sides of the main body support for the membrane changing machine respectively; the longitudinal fixing supports 902 stretch across the upper portions of the transverse bearing plates 901 on the left side and the right side, and the lower end of the longitudinal fixing support 902 is fixedly connected to the middle part of the transverse bearing plate 901 on the same side; every two of the four rolling wheel support frames 904 form a group, the two groups of rolling wheel support frames 904 are arranged at the front end and the rear end of the main body support for the membrane changing machine respectively, one end of each rolling wheel support frame 904 is hinged to the upper end of the longitudinal fixing support 902, and the other end of each rolling wheel support frame 904 is a free end; the free end of each group of rolling wheel support frame is configured to connect with a detachable rolling wheel for membrane uncovering 907 or a detachable rolling wheel for membrane laying 908; every two of the four hydraulic telescopic frames 903 form a group, and the two groups of hydraulic telescopic frames 903 are arranged at the front end and the rear end of the main body support for the membrane changing machine respectively; one end of each hydraulic telescopic frame 903 is hinged to the middle of the longitudinal fixing support 902, and the other end of each hydraulic telescopic frame 903 is hinged to the rolling wheel support frame 904;

a walking device for the membrane changing machine, the walking device comprising walking wheels 905 and a walking motor 906; every two of the four walking wheels 905 form a group, the two groups of walking wheels 905 are arranged on the left side and the right side of the main body support for the membrane changing machine respectively, and the two walking wheels 905 in each group are connected to the front end and the rear end of the transverse bearing plate 901 through connecting pieces respectively; an output shaft of the walking motor 906 is connected to a central shaft of one of the walking wheels 905, and the walking motor 906 is arranged on the transverse bearing plate for membrane changing 901 on one side;

a membrane changing device, the membrane changing device comprising a detachable rolling wheel 907, a detachable rolling wheel 908, a motor for membrane uncovering 909, a motor for membrane laying 910, baffle discs for membrane uncovering 911 and baffle discs for membrane laying 912; the two sides of the detachable rolling wheel 907 are fixedly connected to the two baffle discs 911, and a whole body formed by the detachable rolling wheel 907 and the baffle disc 911 is detachably connected to the free ends of the two rolling wheel support frames 904 located at the front end of the main body support for the membrane changing machine; an output shaft of the motor 909 is connected to a central shaft on one side of the detachable rolling wheel 907 and configured for driving the detachable rolling wheel 907 to rotate; the two sides of the detachable rolling wheel 908 are fixedly connected to the two baffle discs 912, and a whole body formed by the detachable rolling wheel 908 and the baffle discs 912 is detachably connected to the free ends of the two rolling wheel support frames 904 located at the rear end of the main body support for the membrane changing machine; an output shaft of the motor 910 is connected to a central shaft on one side of the detachable rolling wheel 908 and configured for driving the detachable rolling wheel 908 to rotate; and a control platform, the control platform comprising a fixed fence 913, a display controller 914 and an ladder 915; the control platform is integrally supported and fixed by three control console support frames 916, the ladder 915 and the top end of the longitudinal fixing support 902 in a combined mode and located between the detachable rolling wheel 907 and the detachable rolling wheel 908; the fixed fence 913 is welded on a metal floor of the control platform and configured for preventing an operator from falling off; the display controller 914 is arranged in the fixed fence 913, connected to the walking motor 905, the motor for membrane uncovering 909 and the motor for membrane laying 910 through connecting lines, and configured for controlling the walking and turning of the whole machine, the lifting and falling of the detachable rolling wheel 907 and the detachable rolling wheel 908 and the rotation of the detachable rolling wheel 907 and the detachable rolling wheel 908 through a preset intelligent control program; the upper end of the ladder 915 is fixed to the metal floor of the control platform and connected to an inlet of the fixed fence 913, and the lower end of the ladder 915 is fixedly connected to the transverse bearing plate for membrane changing 901 on one side.

Figure 4:
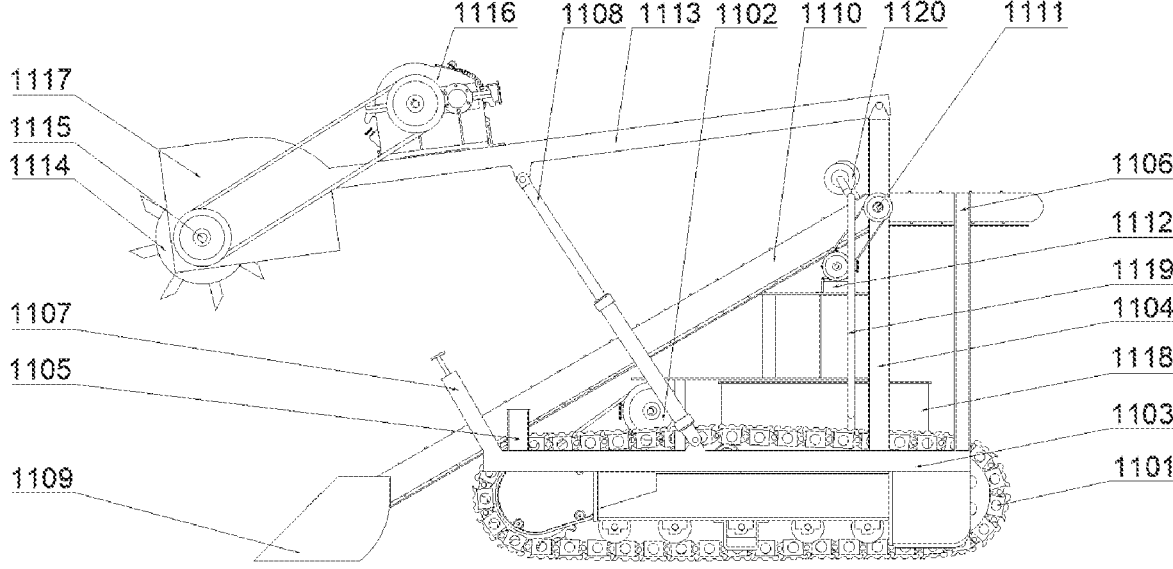
FIG. 4 is a structural schematic diagram of a pile turning machine in FIG. 1.

In the embodiment, preferably, as shown in FIG. 4, the pile turning machine 11 comprises:

a pile turning walking device, the walking device comprising a crawler belt 1101 and a power device of crawler belt 1102 connected to the crawler belt 1101;

a main body support for the pile turning machine, the main body support for the pile turning machine comprising two transverse bearing supports for pile turning 1103 and two longitudinal fixing supports for pile turning 1104; the two transverse bearing supports 1103 are arranged on the two sides of the crawler belt 1101 respectively, and the lower end of each longitudinal fixing support 1104 is fixedly connected to the transverse bearing support 1103 on the same side;

a chain plate conveying device, the chain plate conveying device being obliquely arranged above the transverse bearing supports 1103; the front part of the chain plate conveying device is fixed to the front ends of the two transverse bearing supports 1103 through two front rack of chain plate 1105 located on the two sides of the chain plate conveying device, the rear part of the chain plate conveying device is fixed at the rear ends of the two transverse bearing supports for pile turning 1103 through two rear rack of chain plate 1106 located on the two sides of the chain plate conveying device, and the two sides of the middle part of the chain plate conveying device are connected to the two longitudinal fixing supports 1104 respectively; the chain plate conveying device is configured for actively grabbing materials on the middle layer and the bottom layer, mixing the actively grabbed materials with materials in the top and middle layer turned and thrown to the chain plate conveying device through a material taking device and conveying the mixed materials to the rear position at a fixed distance;

a material taking device, the material taking device being arranged above the chain plate conveying device; the two sides of the rear end of the material taking device are hinged to the upper ends of the two longitudinal fixing supports 1104 respectively, and the material taking device is configured for cutting up the materials in the top and middle layer and turning and throwing the materials backwards to the chain plate conveying device, so that the porosity and permeability of the materials are recovered, and sufficient gas and heat exchange is generated between the materials and the environment; and a material taking support frame, the material taking support frame comprising two static support rods for material taking 1107 and two hydraulic telescopic rods for material taking 1108, one end of each static support rod for material taking 1107 is fixedly connected to the transverse bearing support 1103 on the same side, so that when the pile turning machine 11 is in a non-working state, the static support rods for material taking 1107 bear the material taking device; one end of each hydraulic telescopic rod for material taking 1108 is hinged to one side of the material taking device, the other end of each hydraulic telescopic rod for material taking 1108 is hinged to the transverse bearing support 1103 on the same side, and a hydraulic power device provides power for the hydraulic telescopic rods for material taking 1108 so that the material taking hydraulic telescopic rods can stretch out and draw back in the length direction.

In the embodiment, preferably, the main body support for the pile turning machine further comprises a first partition plate, a second partition plate, a first compartment support and a second compartment support, the first partition plate and the second partition plate are arranged in a space between the chain plate conveying device and the walking device in parallel and divide the space into an top layer area, a middle layer area and a bottom layer area, the upper end of the first compartment support is connected with the first partition plate, and the lower end of the first compartment support is connected to the second partition plate; and the upper end of the second compartment support is connected to the second partition plate, and the lower end of the second compartment support is connected to the turning transverse bearing supports 1103.

In the embodiment, preferably, the chain plate conveying device comprises a bucket 1109, a chain plate 1110, a belt wheel of chain plate 1111 and a power device of chain plate 1112, and the bucket 1109 is connected to the front end of the chain plate 1110 and configured for scraping down compacted materials at the bottommost layer;

the chain plate 1110 comprises an oblique grabbing part and a transverse conveying part horizontally extended from the rear end of the oblique grabbing part, the front part of the oblique grabbing part is fixed to the front ends of the transverse bearing supports 1103 through the front rack of chain plate 1105, and the transverse conveying part is fixed to the rear ends of the transverse bearing supports 1103 through the rear rack of chain plate 1106; the turning position between the oblique grabbing part and the transverse conveying part is connected to the longitudinal fixing supports 1104 through the belt wheel 1111;

the belt wheel 1111 comprises a first belt wheel, a second belt wheel and a first belt, the first belt wheel is arranged at the turning position of the chain plate 1110, the second belt wheel is arranged in the upper layer area of the space between the chain plate conveying device and the walking device, and the first belt is sequentially wound on the first belt wheel and the second belt wheel;

the power device 1112 is connected to the second belt wheel and configured for driving the second belt wheel to rotate, and the power device 1112 is fixed to the first partition plate;

the material taking device comprises a rack for material taking 1113, a rotary drum for material taking 1114, a belt wheel for material taking 1115, a power device of rotary drum 1116 and a protective cover of rotary drum 1117, the rotary drum for material taking 1114 is rotatable and at the front end of the rack for material taking 1113, and the front end of the material taking rack 1113 is hinged to an upper end of the hydraulic telescopic rods for material taking 1108 and the rear end of the rack for material taking 1113 is hinged to the upper end of the longitudinal fixing support 1104; when the pile turning machine 11 is in a non-working state, the free ends of the static support rods for material taking 1107 bear the front part of the rack for material taking 1113;

the belt wheel 1115 comprises a third belt wheel, a fourth belt wheel and a second belt, and the center of the third belt wheel is arranged on a rotating shaft of the material taking rotary drum;

the fourth belt wheel is arranged above the rack 1113 and fixed with the rack 1113 through a fixing piece; the second belt is sequentially wound on the third belt wheel and the fourth belt wheel;

the power device 1116 is connected with the fourth belt wheel and configured for driving the fourth belt wheel to rotate; and the protective cover 1117 is of a cover body structure with a closed upper end and a closed rear end, and the rear end of the protective cover 1117 is connected with the rack 1113 and arranged above the rotary drum 1114 in a covering mode.

In the embodiment, preferably, the pile turning machine 11 further comprises a spraying device, the spraying device comprises a functional liquid tank 1118 configured for accommodating liquid with different functions, a spraying rod 1119 and a spraying head 1120, one end of the spraying rod 1119 extends into the functional liquid tank 1118, the spraying head 1120 is arranged at the other end of the spraying rod 1119, and a spraying pump is arranged between the spraying rod 1119 and the functional liquid tank 1118.

It needs to be noted that the pile turning machine 11 is provided with a pile turning machine control device, and the pile turning machine control device is connected to the power device of crawler belt, the power device of chain plate, the power device of rotary drum, the hydraulic power device and the spraying pump and configured for controlling the pile turning machine 11 to be controlled through a preset intelligent control program and controlling the walking and turning of the walking device, the operation of the chain plate, the lifting and falling of the material taking rack, the contraction and extension of the hydraulic telescopic rod and the starting and stopping of the spraying device.

Figure 5:
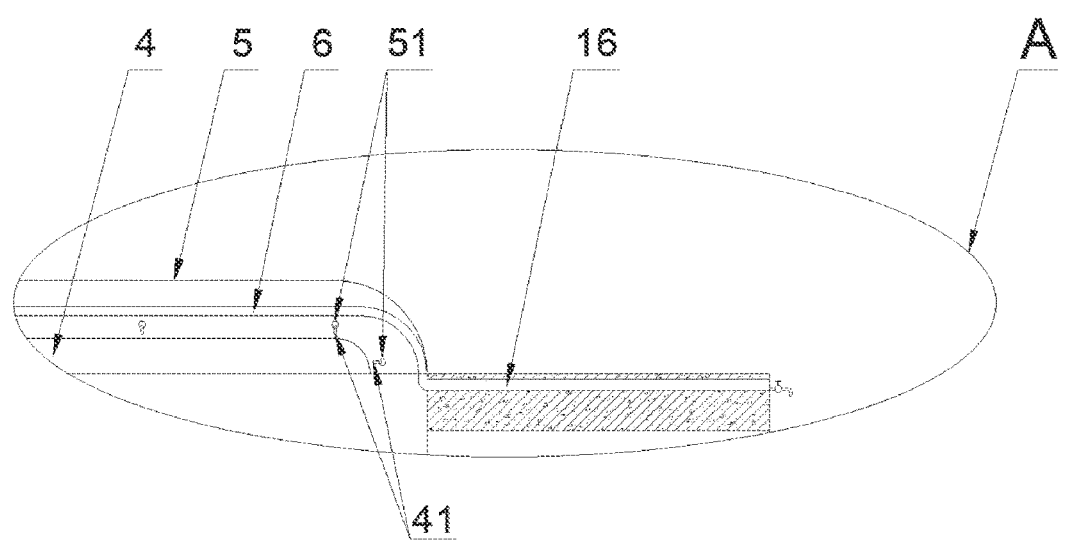
FIG. 5 is an enlarged schematic diagram of part A in FIG. 1.
Figure 6:
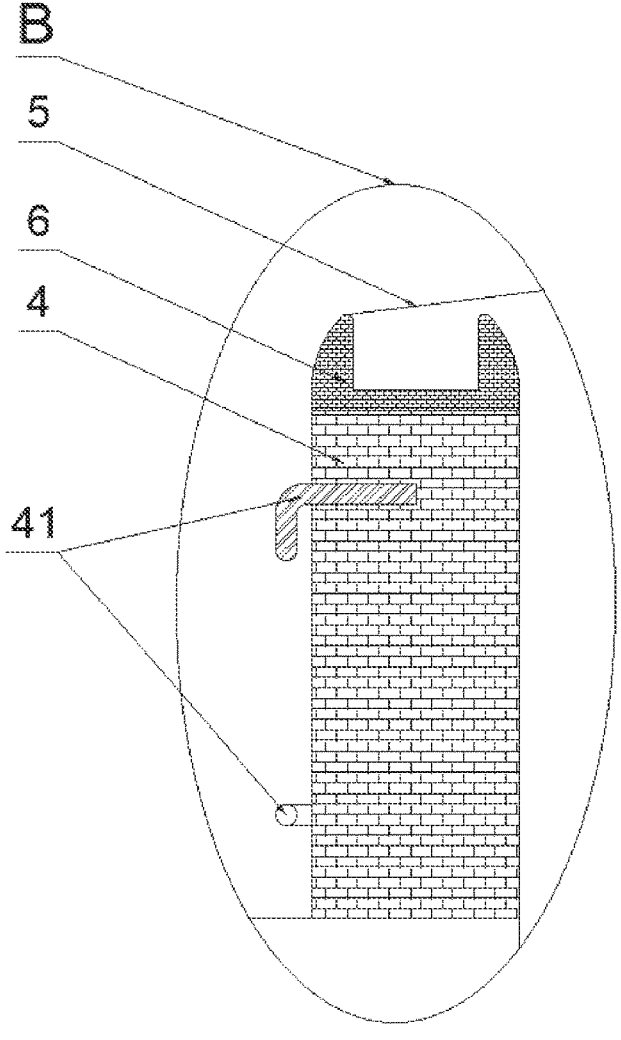
FIG. 6 is an enlarged schematic diagram of part B in FIG. 2.

In the embodiment, preferably, as shown in FIG. 5 and FIG. 6, the condensate collecting system comprises:

a U-shaped diversion part 6, the U-shaped diversion part 6 being a U-shaped component composed of restraining diversion parts on the left side and the right side and a bearing part at the bottom and being arranged at the tops of the above-ground walls of the trough 4; the length and the width of the U-shaped diversion part 6 are equal to those of the top of the above-ground wall of the trough 4; the U-shaped diversion part 6 is tightly attached to the top surfaces of the above-ground walls of the trough 4; in the length direction of the above-ground wall of the trough 4, the top surface of the above-ground wall of the trough 4 is provided with a gentle slope structure with a high middle part and two low ends, and the two ends are of arc-shaped structures;

a functional membrane 5, the functional membrane 5 is covered on the two parallel above-ground walls of the trough 4 and the fermented materials stacked in the middle through the membrane changing machine 9, and the U-shaped diversion part 6 being wrapped in the functional membrane 5; membrane fixing buckles 41 are arranged on the side wall of the above-ground wall of the trough 4, membrane fixing holes 51 are formed in the semipermeable membrane 5, and the semipermeable membrane 5 is connected with the above-ground wall of the trough 4 through cooperation of the membrane fixing buckles 41 and the membrane fixing holes 51; and a conveying channel 16, the conveying channel 16 being arranged below the ground at the two ends of the above-ground wall of the trough 4; one end of the conveying channel 16 is connected with a U-shaped opening of the U-shaped diversion part 6, and the other end of the conveying channel 16 is connected to a faucet.

According to the continuous membrane-covered aerobic fermentation system based on the claims, a use method of the continuous membrane-covered aerobic fermentation system provided by the present disclosure comprises the following steps:

firstly, building the fermentation trough to make sure that the distance between the two above-ground walls of the trough 15 of the fermentation trough is larger than the width of the pile turning machine 11 and smaller than a distance between walking wheels 905 on the two sides of the membrane changing machine 9, and the overall height of the fermentation trough is larger than the height of the pile turning machine 11;

secondly, staking materials to be treated in the feeding area 2 of the fermentation trough every day, the materials with different properties can be stacked in an inter layer mode;

thirdly, covering the membrane by using the membrane changing machine 9, fixing the semipermeable membrane 5 through the membrane fixing buckles 41 and the membrane fixing holes 51, and performing forced ventilation by using the ventilation device;

fourthly, operating the pile turning machine 11 to enter the trough from the inlet for pile turning machine 12 and pass by the discharging area 10 and fermentation area 7 sequentially, and then shifting the materials in the feeding area 2 to the fermentation area 7 by pile turning and, after pile turning is completed, moving out the pile turning machine 11 from the outlet for pile turning machine 1;

fifthly, adding materials into the feeding area 2 every day, turning the materials by the pile turning machine 11 and simultaneously shifting the materials to the end of the inlet for pile turning machine 12, gradually filling the fermentation trough with the materials, moving the initial materials out of the discharging area 10 after complete fermentation and decomposition, collecting the condensate generated during the fermentation process in real time by the condensate collecting system, and then conveying and discharging the condensate; and sixthly, changing the semipermeable membrane by using the membrane changing machine to clean the membrane due to the fact that pores in the membrane are gradually blocked during the fermentation process.

The foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A continuous membrane-covered aerobic fermentation system, comprising:

a fermentation trough which is formed by underground walls of trough, above-ground walls of trough, and a trough bottom; two above-ground walls of trough are fixedly arranged on tops of two underground walls of trough respectively, each above-ground wall of trough is thinner than corresponding underground wall of trough, and an inner surface of each above-ground wall of trough is flush with an inner surface of the corresponding underground wall of trough;

a membrane changing machine comprising detachable rolling wheels, a motor for membrane uncovering, a motor for membrane laying, baffle discs for membrane uncovering and baffle discs for membrane laying, the membrane changing machine being configured for performing membrane uncovering, membrane laying, or membrane changing treatments on a semipermeable membrane covered on the fermentation trough and materials in the fermentation trough;

a pile turning machine comprising a pile turning walking device, a main body support for the pile turning machine, a chain plate conveying device, a material taking device, and a material taking support frame, the pile turning machine being configured for direct turning and further mixing the materials under the membrane without uncovering the membrane, and gradually shifting and conveying the materials to another fixed position; and a condensate collecting system comprising a U-shaped diversion part, the semipermeable membrane, and conveying channels, the condensate collecting system being configured for continuously collecting condensate on a inner surface of the semipermeable membrane in real time and guiding out the condensate, wherein the fermentation trough comprises a feeding area, a fermentation area and a discharging area which are sequentially connected to one another from left to right; and an outlet for pile turning machine and an inlet for pile turning machine are formed at two ends of the fermentation trough respectively, the outlet for pile turning machine is connected to the feeding area, and the inlet for pile turning machine is connected to the discharging area;

wherein the continuous membrane-covered aerobic fermentation system further comprises a sectional ventilation device, wherein the sectional ventilation device comprises an underground ventilation chamber, fans arranged in the underground ventilation chamber, and ventilation ducts, and the underground ventilation chamber is located in middle of the whole fermentation trough and transversely embeds in the trough bottom along a width direction of the fermentation trough; and wherein two groups of fans are arranged, and the two groups of fans are connected to a left end and a right end of the fermentation trough through two groups of ventilation ducts respectively;

wherein the membrane changing machine comprises:

a main body support for the membrane changing machine, the main body support for the membrane changing machine at least comprising transverse bearing plates for membrane changing, a longitudinal fixing support for membrane changing, hydraulic telescopic frames and rolling wheel support frames; two transverse bearing plates for membrane changing are symmetrically arranged on two sides of the main body support for the membrane changing machine respectively; the longitudinal fixing support for membrane changing stretches across upper portions of the transverse bearing plates for membrane changing on a left side and a right side, and a lower end of the longitudinal fixing support for membrane changing is fixedly connected to a middle part of the transverse bearing plate for membrane changing on the same side; every two of four rolling wheel support frames form a group, the two groups of rolling wheel support frames are arranged at a front end and a rear end of the main body support for the membrane changing machine respectively, one end of each rolling wheel support frame is hinged to an upper end of the longitudinal fixing support for membrane changing, and another end of each rolling wheel support frame is a free end; every two of four hydraulic telescopic frames form a group, and two groups of hydraulic telescopic frames are arranged at the front end and the rear end of the main body support for the membrane changing machine respectively; one end of each hydraulic telescopic frame is hinged to the middle of the longitudinal fixing support for membrane changing, and another end of each hydraulic telescopic frame is hinged to the rolling wheel support frame; rising walking wheels and a walking motor; every two of four walking wheels form a group, and two groups of walking wheels are arranged on a left side and a right side of the main body support for the membrane changing machine respectively, and two walking wheels in each group are connected with a front end and a rear end of the transverse bearing plate for membrane changing through connecting pieces respectively; an output shaft of the walking motor is connected to a central shaft of one of the walking wheels, and the walking motor is arranged on a transverse bearing plate for membrane changing on one side;

a membrane changing device, the membrane changing device comprising a detachable rolling wheel for membrane uncovering, a detachable rolling wheel for membrane laying, a motor for membrane uncovering, a motor for membrane laying, two baffle discs for membrane uncovering and two baffle discs for membrane laying; two sides of the detachable rolling wheel for membrane uncovering are fixedly connected to two baffle discs for membrane uncovering, and a whole body formed by the detachable rolling wheel for membrane uncovering and the baffle discs for membrane uncovering is detachably connected to the free ends of two rolling wheel support frames located at the front end of the main body support for the membrane changing machine; an output shaft of the motor for membrane uncovering is connected to a central shaft on one side of the detachable rolling wheel for membrane uncovering and configured for driving the detachable rolling wheel for membrane uncovering to rotate; two sides of the detachable rolling wheel for membrane laying are fixedly connected to two baffle discs for membrane laying, and a whole body formed by the detachable rolling wheel for membrane laying and the baffle discs for membrane laying is detachably connected to the free ends of the two rolling wheel support frames located at the rear end of the main body support for the membrane changing machine; an output shaft of the motor for membrane laying is connected to a central shaft on one side of the detachable rolling wheel for membrane laying and configured for driving the detachable rolling wheel for membrane laying to rotate; and a control platform, the control platform comprising a fixed fence, a display controller and a ladder; the control platform is integrally supported and fixed by three control console support frames, the ladder and a top end of the longitudinal fixing support for membrane changing in a combined mode and located between the detachable rolling wheel for membrane uncovering and the detachable rolling wheel for membrane laying; the fixed fence is welded on a metal floor of the control platform and configured for preventing an operator from falling off; the display controller is arranged in the fixed fence, connected to the walking motor, the motor for membrane uncovering and the motor for membrane laying through connecting lines, and configured for controlling walking and turning of the whole machine, lifting and falling of the detachable rolling wheel for membrane uncovering and the detachable rolling wheel for membrane laying and rotation of the detachable rolling wheel for membrane uncovering and the detachable rolling wheel for membrane laying through a preset intelligent control program; an upper end of the ladder is fixed to the metal floor of the control platform and connected to an inlet of the fixed fence, and a lower end of the ladder is fixedly connected to the transverse bearing plate for membrane changing on one side.

2. The continuous membrane-covered aerobic fermentation system according to claim 1, wherein the condensate collecting system comprises:

a U-shaped diversion part, the U-shaped diversion part is a U-shaped component composed of restraining diversion parts on a left side and a right side and a bearing part at a bottom and arranged at top of the above-ground walls of trough; a length and a width of the U-shaped diversion part are equal to those of top surfaces of the above-ground wall of trough; the U-shaped diversion part is tightly attached to the top surfaces of the above-ground walls of trough; in a length direction of the above-ground wall of trough, the top surface of each above-ground wall of trough is provided with a gentle slope structure with a high middle part and two low ends, and the two ends are of arc-shaped structures;

the semipermeable membrane, the semipermeable membrane is covered on two parallel above-ground walls of the trough and the materials stacked in the trough through the membrane changing machine, and the U-shaped diversion part is wrapped under the semipermeable membrane; membrane fixing buckles are arranged on outer surfaces of the above-ground wall of trough, membrane fixing holes are formed in the semipermeable membrane, and the semipermeable membrane is fixed to the above-ground wall of the trough by cooperation of the membrane fixing buckles and the membrane fixing holes; and the conveying channels, the conveying channels are arranged under ground at the ends of the above-ground walls of trough; one end of each conveying channel is connected to U-shaped diversion part, and another end of each conveying channel is connected to a faucet.

3. An application method of the continuous membrane-covered aerobic fermentation system according to claim 1, comprising the following steps:

i) building the fermentation trough to make sure a distance between the two above-ground walls of the fermentation trough is larger than a width of the pile turning machine and smaller than a distance between walking wheels on two sides of the membrane changing machine, and an overall height of the fermentation trough is larger than a height of the pile turning machine;

ii) staking materials to be treated in the feeding area of the fermentation trough every day, the materials with different properties can be stacked in an inter layer mode;

iii) covering the membrane by using the membrane changing machine, fixing the semipermeable membrane through membrane fixing buckles and membrane fixing holes, and performing forced ventilation by using the ventilation device;

iv) operating the pile turning machine to enter the trough from inlet for the pile turning machine and pass by the discharging area and fermentation area sequentially, and then shifting the materials in the feeding area to the fermentation area by pile turning, after pile turning is completed, moving out the pile turning machine from the outlet for pile turning machine;

v) adding materials into the feeding area every day, turning the materials by the pile turning machine and simultaneously shifting the materials to the end of the discharging area, gradually filling the fermentation trough with the materials, moving initial materials out of the discharging area after complete fermentation and decomposition, collecting the condensate generated during the fermentation process in real time by the condensate collecting system, and then conveying and discharging the condensate by the conveying channels; and vi) changing the semipermeable membrane by using the membrane changing machine to clean the membrane due to the fact that pores in the membrane are gradually blocked during the fermentation process.

4. An application method of the continuous membrane-covered aerobic fermentation system according to claim 1, comprising the following steps:

i) building the fermentation trough to make sure a distance between the two above-ground walls of the fermentation trough is larger than a width of the pile turning machine and smaller than a distance between walking wheels on two sides of the membrane changing machine, and an overall height of the fermentation trough is larger than a height of the pile turning machine;

ii) staking materials to be treated in the feeding area of the fermentation trough every day, the materials with different properties can be stacked in an inter layer mode;

iii) covering the membrane by using the membrane changing machine, fixing the semipermeable membrane through membrane fixing buckles and membrane fixing holes, and performing forced ventilation by using the ventilation device;

iv) operating the pile turning machine to enter the trough from inlet for the pile turning machine and pass by the discharging area and fermentation area sequentially, and then shifting the materials in the feeding area to the fermentation area by pile turning, after pile turning is completed, moving out the pile turning machine from the outlet for pile turning machine;

v) adding materials into the feeding area every day, turning the materials by the pile turning machine and simultaneously shifting the materials to the end of the discharging area, gradually filling the fermentation trough with the materials, moving initial materials out of the discharging area after complete fermentation and decomposition, collecting the condensate generated during the fermentation process in real time by the condensate collecting system, and then conveying and discharging the condensate by the conveying channels; and vi) changing the semipermeable membrane by using the membrane changing machine to clean the membrane due to the fact that pores in the membrane are gradually blocked during the fermentation process.

5. A continuous membrane-covered aerobic fermentation system, comprising:

a fermentation trough which is formed by underground walls of trough, above-ground walls of trough, and a trough bottom; two above-ground walls of trough are fixedly arranged on tops of two underground walls of trough respectively, each above-ground wall of trough is thinner than corresponding underground wall of trough, and an inner surface of each above-ground wall of trough is flush with an inner surface of the corresponding underground wall of trough;

a membrane changing machine comprising detachable rolling wheels, a motor for membrane uncovering, a motor for membrane laying, baffle discs for membrane uncovering and baffle discs for membrane laying, the membrane changing machine being configured for performing membrane uncovering, membrane laying, or membrane changing treatments on a semipermeable membrane covered on the fermentation trough and materials in the fermentation trough;

a pile turning machine comprising a pile turning walking device, a main body support for the pile turning machine, a chain plate conveying device, a material taking device, and a material taking support frame, the pile turning machine being configured for direct turning and further mixing the materials under the membrane without uncovering the membrane, and gradually shifting and conveying the materials to another fixed position; and a condensate collecting system comprising a U-shaped diversion part, a semipermeable membrane, and conveying channels, the condensate collecting system being configured for continuously collecting condensate on a inner surface of the semipermeable membrane in real time and guiding out the condensate, wherein the fermentation trough comprises a feeding area, a fermentation area and a discharging area which are sequentially connected to one another from left to right; and an outlet for pile turning machine and an inlet for pile turning machine are formed at two ends of the fermentation trough respectively, the outlet for pile turning machine is connected to the feeding area, and the inlet for pile turning machine is connected to the discharging area, wherein the continuous membrane-covered aerobic fermentation system further comprises a sectional ventilation device, wherein the sectional ventilation device comprises an underground ventilation chamber, fans arranged in the underground ventilation chamber, and ventilation ducts, and the underground ventilation chamber is located in middle of the whole fermentation trough and transversely embeds in the trough bottom along a width direction of the fermentation trough; and wherein two groups of fans are arranged, and the two groups of fans are connected to a left end and a right end of the fermentation trough through two groups of ventilation ducts respectively, and wherein the pile turning machine comprises:

a walking device for the pile turning machine, the pile turning walking device comprising a crawler belt and a power device of crawler belt connected to the crawler belt;

a main body support for the pile turning machine, the main body support for the pile turning machine comprising two transverse bearing supports for pile turning and two longitudinal fixing supports for pile turning; the two transverse bearing supports for pile turning are arranged on two sides of the crawler belt respectively, and a lower end of each longitudinal fixing support for pile turning is fixedly connected to the transverse bearing support for pile turning on the same side;

a chain plate conveying device, the chain plate conveying device being obliquely arranged above the transverse bearing supports for pile turning; a front part of the chain plate conveying device is fixed to front ends of the two transverse bearing supports for pile turning through two front racks of chain plate located on two sides of the chain plate conveying device, a rear part of the chain plate conveying device is fixed to the rear ends of two transverse bearing supports for pile turning through two rear racks of chain plate located on the two sides of the chain plate conveying device, and two sides of the middle part of the chain plate conveying device are connected to two longitudinal fixing supports for pile turning respectively; the chain plate conveying device is configured for actively grabbing materials in a middle layer and a bottom layer, mixing the actively grabbed materials with materials in a top and a middle layer turned and thrown to the chain plate conveying device through a material taking device and conveying the mixed materials to a rear position at a fixed distance;

a material taking device, the material taking device being arranged above the chain plate conveying device; two sides of a rear end of the material taking device are hinged to upper ends of the two longitudinal fixing supports for pile turning respectively, and the material taking device is configured for cutting up the materials in the top and the middle layer and turning and throwing the materials backwards to the chain plate conveying device, so that the porosity and permeability of the materials are recovered, and sufficient gas and heat exchange is generated between the materials and environment; and a support frame for material taking, the support frame for material taking comprising two static support rods for material taking and two hydraulic telescopic rods for material taking, one end of each static support rod for material taking is fixedly connected to the transverse bearing support for pile turning on the same side, so that when the pile turning machine is in a non-working state, the static support rods for material taking bear the material taking device; one end of each hydraulic telescopic rod for material taking is hinged to one side of the material taking device, another end of each hydraulic telescopic rod for material taking is hinged to the transverse bearing support for pile turning on the same side, and a hydraulic power device provides power for the hydraulic telescopic rods for material taking to stretch out and draw back in the length direction.

6. The continuous membrane-covered aerobic fermentation system according to claim 5, wherein the main body support for the pile turning machine further comprises a first partition plate, a second partition plate, a first compartment support and a second compartment support, the first partition plate and the second partition plate are arranged in a space between the chain plate conveying device and the walking device for the pile turning machine in parallel and divide the space into a top layer area, a middle layer area and a bottom layer area, the upper end of the first compartment support is connected to the first partition plate, and the lower end of the first compartment support is connected to the second partition plate; and the upper end of the second compartment support is connected to the second partition plate, and the lower end of the second compartment support is connected to the transverse bearing supports for pile turning.

7. The continuous membrane-covered aerobic fermentation system according to claim 6, wherein the chain plate conveying device comprises a bucket, a chain plate, a belt wheel of chain plate and a power device of chain plate, and the bucket is connected to the front end of the chain plate and configured for scraping down compacted materials in the bottom layer;

the chain plate comprises an oblique grabbing part and a transverse conveying part horizontally extended from the rear end of the oblique grabbing part, a front part of the oblique grabbing part is fixed to a front ends of the transverse bearing supports for pile turning through the front racks of chain plate, and the transverse conveying part is fixed to a rear ends of the transverse bearing supports for pile turning through the rear racks of chain plate; a bending position between the oblique grabbing part and the transverse conveying part is connected to the longitudinal fixing supports for pile turning through the belt wheels of chain plate;

the belt wheels of chain plate comprises a first belt wheel, a second belt wheel and a first belt, the first belt wheel is arranged at the bending position of the chain plate, the second belt wheel is arranged in atop layer area of the space between the chain plate conveying device and the walking device for the pile turning machine, and the first belt is sequentially wound on the first belt wheel and the second belt wheel;

the power device of chain plate is connected to the second belt wheel and configured for driving the second belt wheel to rotate, and the power device of chain plate is fixed to the first partition plate;

the material taking device comprises a rack for material taking, a rotary drum for material taking, a belt wheel for material taking, and a power device of rotary drum and a protective cover of rotary drum, the rotary drum for material taking is rotatable and arranged at a front end of the rack for material taking, and the front end of the rack for material taking is hinged to an upper end of the hydraulic telescopic rods for material taking and a rear end of the rack for material taking is hinged to an upper end of the longitudinal fixing support for pile turning; when the pile turning machine is in a non-working state, free ends of the static support rods for material taking bear the front part of the rack for material taking;

the belt wheel for material taking comprises a third belt wheel, a fourth belt wheel and a second belt, and center of the third belt wheel is arranged on a rotating shaft of the rotary drum for material taking; the second belt is sequentially wound on the third belt wheel and the fourth belt wheel;

the power device of rotary drum is connected to the fourth belt wheel and configured for driving the fourth belt wheel to rotate; and the protective cover of rotary drum is closed in upper end and rear end, and a rear end of the protective cover of rotary drum is connected to the rack for material taking and arranged and covered above the rotary drum for material taking.

8. The continuous membrane-covered aerobic fermentation system according to claim 7, wherein the pile turning machine further comprises a spraying device, the spraying device comprises a functional liquid tank configured for accommodating liquid with different functions, a spraying rod and a spraying head, one end of the spraying rod extends into the functional liquid tank, the spraying head is arranged at another end of the spraying rod, and a spraying pump is arranged between the spraying rod and the functional liquid tank.

9. An application method of the continuous membrane-covered aerobic fermentation system according to claim 5, comprising the following steps:

i) building the fermentation trough to make sure a distance between the two above-ground walls of the fermentation trough is larger than a width of the pile turning machine and smaller than a distance between walking wheels on two sides of the membrane changing machine, and an overall height of the fermentation trough is larger than a height of the pile turning machine;

ii) staking materials to be treated in the feeding area of the fermentation trough every day, the materials with different properties can be stacked in an inter layer mode;

iii) covering the membrane by using the membrane changing machine, fixing the semipermeable membrane through membrane fixing buckles and membrane fixing holes, and performing forced ventilation by using the ventilation device;

iv) operating the pile turning machine to enter the trough from inlet for the pile turning machine and pass by the discharging area and fermentation area sequentially, and then shifting the materials in the feeding area to the fermentation area by pile turning, after pile turning is completed, moving out the pile turning machine from the outlet for pile turning machine;

v) adding materials into the feeding area every day, turning the materials by the pile turning machine and simultaneously shifting the materials to the end of the discharging area, gradually filling the fermentation trough with the materials, moving initial materials out of the discharging area after complete fermentation and decomposition, collecting the condensate generated during the fermentation process in real time by the condensate collecting system, and then conveying and discharging the condensate by the conveying channels; and vi) changing the semipermeable membrane by using the membrane changing machine to clean the membrane due to the fact that pores in the membrane are gradually blocked during the fermentation process.

10. An application method of the continuous membrane-covered aerobic fermentation system according to claim 6, comprising the following steps:

i) building the fermentation trough to make sure a distance between the two above-ground walls of the fermentation trough is larger than a width of the pile turning machine and smaller than a distance between walking wheels on two sides of the membrane changing machine, and an overall height of the fermentation trough is larger than a height of the pile turning machine;

ii) staking materials to be treated in the feeding area of the fermentation trough every day, the materials with different properties can be stacked in an inter layer mode;

iii) covering the membrane by using the membrane changing machine, fixing the semipermeable membrane through membrane fixing buckles and membrane fixing holes, and performing forced ventilation by using the ventilation device;

iv) operating the pile turning machine to enter the trough from inlet for the pile turning machine and pass by the discharging area and fermentation area sequentially, and then shifting the materials in the feeding area to the fermentation area by pile turning, after pile turning is completed, moving out the pile turning machine from the outlet for pile turning machine;

v) adding materials into the feeding area every day, turning the materials by the pile turning machine and simultaneously shifting the materials to the end of the discharging area, gradually filling the fermentation trough with the materials, moving initial materials out of the discharging area after complete fermentation and decomposition, collecting the condensate generated during the fermentation process in real time by the condensate collecting system, and then conveying and discharging the condensate by the conveying channels; and vi) changing the semipermeable membrane by using the membrane changing machine to clean the membrane due to the fact that pores in the membrane are gradually blocked during the fermentation process.

11. An application method of the continuous membrane-covered aerobic fermentation system according to claim 7, comprising the following steps:

i) building the fermentation trough to make sure a distance between the two above-ground walls of the fermentation trough is larger than a width of the pile turning machine and smaller than a distance between walking wheels on two sides of the membrane changing machine, and an overall height of the fermentation trough is larger than a height of the pile turning machine;

ii) staking materials to be treated in the feeding area of the fermentation trough every day, the materials with different properties can be stacked in an inter layer mode;

iii) covering the membrane by using the membrane changing machine, fixing the semipermeable membrane through membrane fixing buckles and membrane fixing holes, and performing forced ventilation by using the ventilation device;

iv) operating the pile turning machine to enter the trough from inlet for the pile turning machine and pass by the discharging area and fermentation area sequentially, and then shifting the materials in the feeding area to the fermentation area by pile turning, after pile turning is completed, moving out the pile turning machine from the outlet for pile turning machine;

v) adding materials into the feeding area every day, turning the materials by the pile turning machine and simultaneously shifting the materials to the end of the discharging area, gradually filling the fermentation trough with the materials, moving initial materials out of the discharging area after complete fermentation and decomposition, collecting the condensate generated during the fermentation process in real time by the condensate collecting system, and then conveying and discharging the condensate by the conveying channels; and vi) changing the semipermeable membrane by using the membrane changing machine to clean the membrane due to the fact that pores in the membrane are gradually blocked during the fermentation process.

12. An application method of the continuous membrane-covered aerobic fermentation system according to claim 8, comprising the following steps:

i) building the fermentation trough to make sure a distance between the two above-ground walls of the fermentation trough is larger than a width of the pile turning machine and smaller than a distance between walking wheels on two sides of the membrane changing machine, and an overall height of the fermentation trough is larger than a height of the pile turning machine;

ii) staking materials to be treated in the feeding area of the fermentation trough every day, the materials with different properties can be stacked in an inter layer mode;

iii) covering the membrane by using the membrane changing machine, fixing the semipermeable membrane through membrane fixing buckles and membrane fixing holes, and performing forced ventilation by using the ventilation device;

iv) operating the pile turning machine to enter the trough from inlet for the pile turning machine and pass by the discharging area and fermentation area sequentially, and then shifting the materials in the feeding area to the fermentation area by pile turning, after pile turning is completed, moving out the pile turning machine from the outlet for pile turning machine;

v) adding materials into the feeding area every day, turning the materials by the pile turning machine and simultaneously shifting the materials to the end of the discharging area, gradually filling the fermentation trough with the materials, moving initial materials out of the discharging area after complete fermentation and decomposition, collecting the condensate generated during the fermentation process in real time by the condensate collecting system, and then conveying and discharging the condensate by the conveying channels; and vi) changing the semipermeable membrane by using the membrane changing machine to clean the membrane due to the fact that pores in the membrane are gradually blocked during the fermentation process.

13. An application method of the continuous membrane-covered aerobic fermentation system according to claim 2, comprising the following steps:

i) building the fermentation trough to make sure a distance between the two above-ground walls of the fermentation trough is larger than a width of the pile turning machine and smaller than a distance between walking wheels on two sides of the membrane changing machine, and an overall height of the fermentation trough is larger than a height of the pile turning machine;

ii) staking materials to be treated in the feeding area of the fermentation trough every day, the materials with different properties can be stacked in an inter layer mode;

iii) covering the membrane by using the membrane changing machine, fixing the semipermeable membrane through membrane fixing buckles and membrane fixing holes, and performing forced ventilation by using the ventilation device;

iv) operating the pile turning machine to enter the trough from inlet for the pile turning machine and pass by the discharging area and fermentation area sequentially, and then shifting the materials in the feeding area to the fermentation area by pile turning, after pile turning is completed, moving out the pile turning machine from the outlet for pile turning machine;

v) adding materials into the feeding area every day, turning the materials by the pile turning machine and simultaneously shifting the materials to the end of the discharging area, gradually filling the fermentation trough with the materials, moving initial materials out of the discharging area after complete fermentation and decomposition, collecting the condensate generated during the fermentation process in real time by the condensate collecting system, and then conveying and discharging the condensate by the conveying channels; and vi) changing the semipermeable membrane by using the membrane changing machine to clean the membrane due to the fact that pores in the membrane are gradually blocked during the fermentation process.

\* \* \* \* \*